United States Patent
Morrison (10) Patent No.: US 7,551,636 B2
(45) Date of Patent: Jun. 23, 2009

(54) SYSTEM AND METHOD FOR BUFFERING VARIABLE-LENGTH DATA

(75) Inventor: Peter E. Morrison, Miranda (AU)

(73) Assignee: Computer Associates Think, Inc., Islandia, NY (US)

(*) Notice: Subject to any disclaimer, the term of this patent is extended or adjusted under 35 U.S.C. 154(b) by 768 days.

(21) Appl. No.: 10/888,153

(22) Filed: Jul. 9, 2004

(65) Prior Publication Data

US 2005/0122971 A1 Jun. 9, 2005

Related U.S. Application Data

(60) Provisional application No. 60/486,064, filed on Jul. 10, 2003.

(51) Int. Cl.
H04L 12/28 (2006.01)
H04L 12/56 (2006.01)

(52) U.S. Cl. .................. 370/412; 370/413; 370/415

(58) Field of Classification Search ........ 370/381, 370/389, 412; 711/171, 173, 153, 170, 133, 711/159, 160
See application file for complete search history.

(56) References Cited

U.S. PATENT DOCUMENTS

| | | | |
|---|---|---|---|
| 4,914,675 A | 4/1990 | Fedele | |
| 5,122,874 A | 6/1992 | Lhuillier et al. | |
| 5,138,315 A | 8/1992 | Le Queau et al. | |
| 5,173,695 A | 12/1992 | Sun et al. | |
| 5,309,156 A | 5/1994 | Fujiyama | |
| 5,367,643 A | 11/1994 | Chang et al. | |
| 5,802,598 A * | 9/1998 | Watt | 711/170 |
| 5,828,903 A | 10/1998 | Sethuram et al. | |
| 5,845,152 A | 12/1998 | Anderson et al. | |
| 6,032,190 A | 2/2000 | Bremer et al. | |
| 6,088,777 A * | 7/2000 | Sorber | 711/171 |
| 6,279,051 B1 | 8/2001 | Gates et al. | |
| 6,587,058 B1 | 7/2003 | Deeley et al. | |
| 6,708,233 B1 | 3/2004 | Fuller et al. | |
| 6,892,284 B2 * | 5/2005 | Ling et al. | 711/153 |
| 7,266,132 B1 * | 9/2007 | Liu et al. | 370/538 |
| 2004/0221120 A1 * | 11/2004 | Abrashkevich et al. | 711/170 |

FOREIGN PATENT DOCUMENTS

EP 0 889 622 A2 1/1999

OTHER PUBLICATIONS

Notification of Transmittal of the International Search Report and the Written Opinion of the International Searching Authority, or the Declaration—Form PCT/ISA/220 (3 pages), PCT International Search Report—Form PCT/ISA/210 (4 pages), and PCT Written Opinion of the International Searching Authority—Form PCT/ISA/237—5 pages, for PCT/US2004/022246, mailed Nov. 2, 2004.

* cited by examiner

Primary Examiner—Ricky Ngo
Assistant Examiner—David Oveissi
(74) Attorney, Agent, or Firm—Pillsbury Winthrop Shaw Pittman LLP (57) ABSTRACT

A method for buffering variable length data at a decoupler includes receiving, at a decoupler, a request to queue variable length data from a producer, with the decoupler comprising a management header and a buffer pool. One of a plurality of fixed-length segments in the buffer pool is dynamically selected based, at least in part, on the management header. Buffer space in the selected segment is automatically allocated based on the request and the allocated space is then populated with the variable length data.

30 Claims, 3 Drawing Sheets

SYSTEM AND METHOD FOR BUFFERING VARIABLE-LENGTH DATA

RELATED APPLICATION

This application claims the priority under 35 U.S.C. §119 of provisional application Ser. No. 60/486,064 filed Jul. 10, 2003.

TECHNICAL FIELD

This disclosure relates generally to the field of data processing and, more particularly, to a system and method for buffering variable-length data.

BACKGROUND

Modern computer systems often deal with large volumes of data. A computer system may have two related processes concurrently executing and processing the set of data. For example, one process may create or retrieve data, while the other process concurrently analyzes or processes the data to accomplish some task. Various traditional algorithms, such as the "ring-buffer" or LIFO stack, are used for buffering the data between the processes. These techniques normally require manipulation of control structures to ensure the integrity of the buffers and chains. These conventional manipulations may include locking of complex structures, spin-loops, or suspensions.

SUMMARY

This disclosure provides a system and method for buffering variable-length data. In one embodiment, the method for buffering variable length data at a decoupler includes receiving, at a decoupler, a request to queue variable length data from a producer, with the decoupler comprising a management header and a buffer pool. One of a plurality of fixed-length segments in the buffer pool is dynamically selected based, at least in part on the management header. Buffer space in the selected segment is automatically allocated based on the request and the allocated space is then populated with the variable length data. The details of one or more embodiments of the disclosure are set forth in the accompanying drawings and the description below. Particular features, objects, and advantages of the disclosure will be apparent from the description and drawings and from the claims.

DESCRIPTION OF EXAMPLE EMBODIMENTS

Figure 1:
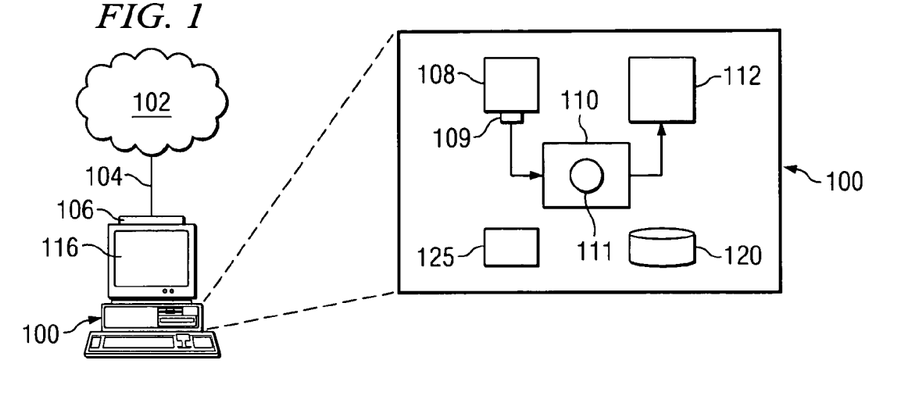
FIG. 1 illustrates an example system for buffering variable-length data in accordance with one embodiment of the present disclosure.

FIG. 1 is a block diagram illustrating a computer system 100 for buffering variable-length data according to one embodiment of the present disclosure. In general, the present disclosure contemplates any system 100 that automatically provides high-speed, reliable buffering of variable-length data by logically locating a decoupler 110 between a producer process 108 and a consumer process 112. Accordingly, computer 100 may comprise a portion of an information management system operable to dynamically supply a high-speed, variable length buffer for data from multiple producer processes 108 without locking or spin-looping. For example, system 100 may include a TCP/IP packet analyzer that captures and analyzes incoming and outgoing packets from a TCP/IP stack through decoupler 110. The term "automatically," as used herein, generally means that the appropriate processing is substantially performed by at least part of system 100. It should be understood that "automatically" further contemplates any suitable user interaction with system 100 without departing from the scope of this disclosure. The term "dynamically," as used herein, generally means that the appropriate processing is determined, at least in part, at run-time based on one or more variables such as, for example, the length of data to be buffered by decoupler 110.

Computer system 100 includes graphical user interface 116, memory 120, processor 125, and an input device such as a keyboard, mouse or touch screen. The illustrated system 100 also includes producer process 108, decoupler 110, and consumer process 112 that may be stored in memory 120 and executed or processed by processor 125. At a high level, as used in this document the term "computer" is intended to encompass a personal computer, workstation, server network computer, mainframe or any other suitable processing device. Computer system 100 may execute any operating system including UNIX, Windows, Linux, and others. FIG. 1 only provides one example of a computer that may be used with the disclosure. The present disclosure contemplates computers other than general purpose computers as well as computers without conventional operating systems.

Graphical user interface (GUI) 116 comprises, at least, a graphical user interface operable to allow the user of computer 100 to interact with one or more processes executing on computer 100. Generally, GUI 116 provides the user of computer 100 with an efficient and user-friendly presentation of data provided by computer 100 or network 102. GUI 116 may comprise a plurality of displays having interactive fields, pull-down lists, and buttons operated by the user. In one example, GUI 116 presents an explorer-type interface and receives commands from the user. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in computer 100 and efficiently presents the information to the user. Network 102 can accept data from the user of computer 100 via the web browser (e.g., Microsoft Internet Explorer or Netscape Navigator) and return the appropriate HTML, Java, or eXtensible Markup Language (XML) responses.

Computer 100 may include an interface 106 for communicating with other computer systems over network 102 such as, for example, in a client-server or other distributed environment via link 104. In certain embodiments, decoupler 110 receives data from producer process 108 via network 102 for storage in memory 120. Network 102 facilitates wireless or wireline communication between computer system 100 and any other computer. Network 102 may communicate, for example, Internet Protocol (IP) packets, Frame Relay frames, Asynchronous Transfer Mode (ATM) cells, voice, video, data, and other suitable information between network addresses. Network 102 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 106 comprises logic encoded in software and/or hardware in a suitable combination and operable to communicate with network 102 via link 104. More specifically, interface 106 may comprise software supporting one or more communications protocols associated with link 104 and communications network 102 hardware operable to communicate physical signals.

Memory 120 may include any memory, hard drive, or database module and may take the form of volatile or non-volatile memory including, without limitation, magnetic media, optical media, random access memory (RAM), read-only memory (ROM), removable media, or any other suitable local or remote memory component. Memory 120 may include any suitable data without departing from the scope of this disclosure. Processor 125 executes instructions and manipulates data to perform the operations of computer 100, such as processing by decoupler 110. Although FIG. 1 illustrates a single processor 125 in computer 100, multiple processors 125 may be used and reference to processor 125 is meant to include multiple processors 125 where applicable.

In the embodiment illustrated, computer 100 further includes one or more producer processes 108, one or more consumer processes 112, and decoupler 110 that buffers data from one or more producer processes 108 for subsequent use by one or more consumer processes 112. Each producer process 108 includes any hardware, software, firmware, logic, or combination thereof operable to be produce, compile, receive, or retrieve data to be processed by consumer process 112. Moreover, producer process 108 communicates a least a portion of this data to decoupler 110 for buffering. For example, producer process 108 may comprise a TCP/IP stack or a sensor in an intrusion detection system. While illustrated as residing locally on computer 100, producer process 108 may be located on or distributed to a remote system without departing from the scope of this disclosure—in short, while illustrated producer process 108 resides in the same address space as decoupler 110, these two modules may be networked or otherwise communicably coupled. In certain embodiments, one or more producing processes 108 may include system exits 109. Generally, each exit 109 comprises software or logic operable to provide processing separate from but associated with producer process 108. Each consumer process 112 includes any hardware, software, firmware, logic, or combination thereof operable to retrieve or receive data from decoupler 110 or producer process 108. For example, consumer process 112 may comprise a TCP/IP packet analyzer operable to receive data from the TCP/IP stack or decoupler 110. While illustrated consumer process 112 resides in the same address space as decoupler 110, these two modules may be networked or otherwise communicably coupled. Moreover, while not illustrated, consumer process 112 may further include system exits or be communicably coupled to producer process 108 without departing from the scope of this disclosure.

Decoupler 110 could include any hardware, software, firmware, logic, or combination thereof operable to suitably buffer data from producer process 108 within the scope of this disclosure. For example, decoupler 110 may be written in any appropriate computer language including C, C++, Java, Visual Basic, Assembler, Pearl and others. Further, it will be understood that while decoupler 110 is illustrated as a single multi-tasked module, the features and functionality performed by this module may be performed by multiple modules such as, for example, a management module and a buffering module. Decoupler 110 is typically logically located between producer process 108 and consumer process 112, thereby allowing decoupler 110 to buffer portions of data for processing by consumer process 112. In short, decoupler 110 may implement any appropriate technique to efficiently buffer variable length data between producer process 108 and consumer process 112. Decoupler 110 includes, at least, buffer pool 111. In one embodiment, buffer pool 111 is a relatively large storage space operable to reduce the number of memory pages utilized. But buffer pool 111 may comprise any size of storage operable to sufficiently buffer one communications of variable length data. As described in more detail in FIG. 2, buffer pool 111 is logically divided into a plurality of fixed-length segments 215, thereby allowing concurrent buffering when appropriate.

In one aspect of operation, decoupler 110 receives a request from producer process 108 to queue data. Often, this request will include the length of data to be queued. Based at least in part on this request, decoupler 110 selects and allocates buffer space within segmented buffer pool 111. Once allocated, decoupler 110 receives the data and populates the buffer with the received data. Decoupler 110 then notifies consumer process 112 that the data is available for processing via, for example, enqueuing the buffer in a known location. Once consumer process 112 retrieves or otherwise processes the data, decoupler 110 releases the buffer and returns the allocated space to buffer pool 111.

Figure 2:
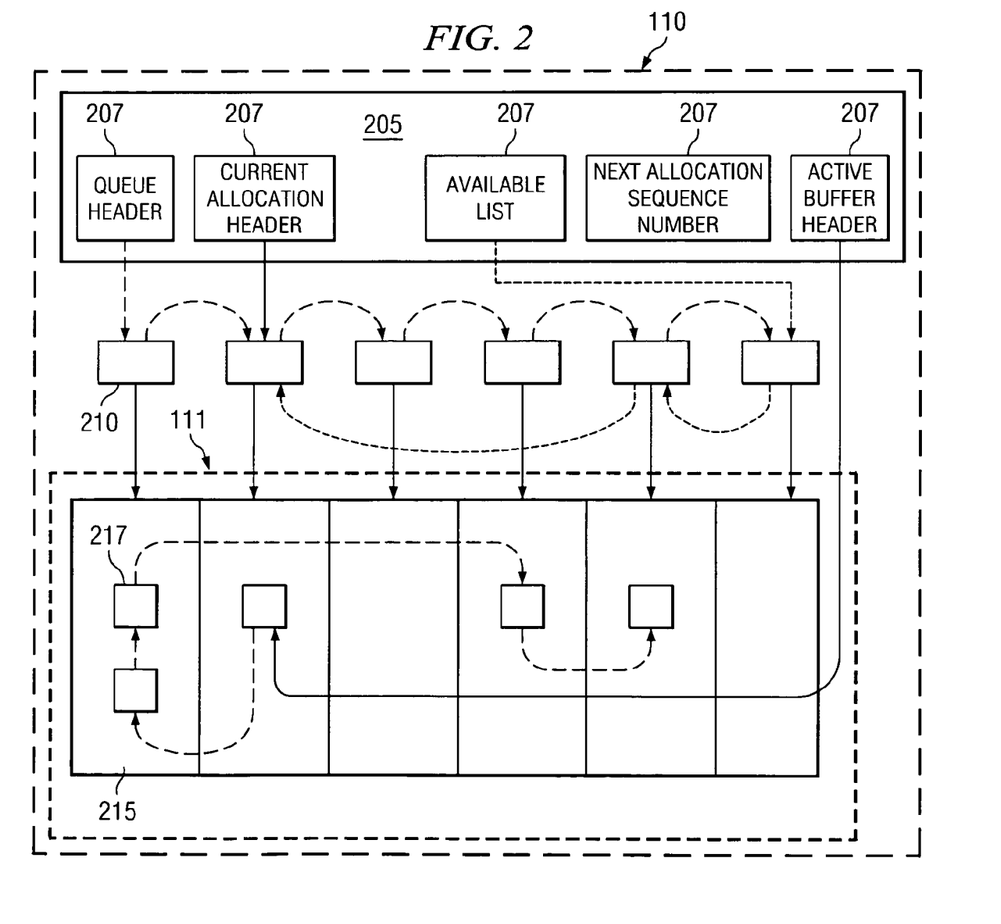
FIG. 2 illustrates an example decoupler associated with the system in FIG. 1.

FIG. 2 illustrates one embodiment of the example decoupler 110 in FIG. 1. In this embodiment, decoupler 110 comprises a three-tier architecture to logically separate processing and memory management, often resulting in more efficient and reliable buffering. For example, the first tier may comprise segmented memory for the storage of the variable-length buffers. Example second tier may comprise a decoupler manager that provides data and/or algorithms for the management of the other tiers. Example third tier may comprise a plurality of lower-level managers, each lower-level manager associated with one of the segmented memory spaces. At a high level, illustrated decoupler 10 includes three example tiers: buffer pool 111, management header 205, and a plurality of segment headers 210.

Buffer pool 111 includes a plurality of segments 215. In one embodiment, each segment 215 comprises a logical, fixed-length section of buffer pool 111. For example, each segment 215 may comprise a unique starting address and a substantially similar length. Each segment 215 may include one or more buffers 217. According to particular embodiments, buffer 217 may comprise a plurality of variables and objects such as, for example, a buffer management header, source environment information, and the queued application data from producer process 108. Generally, example buffer management header includes information such as active queue chain, total length, data length, and other suitable information that allows decoupler 110 to efficiently manage buffer 217. The source environment information may comprise a central location such as job name, process ID, and other environment information.

Each segment 215 is associated with one segment header 210. Generally, segment header 210 includes information used by decoupler 110 to efficiently manage the plurality of segments 215. This information may include a plurality of variables and objects such as, for example, an allocation header, a freed bytes counter, an activation sequence number, and a state field. The state field may comprise one of the follow values: "available," "allocation," "empty," "refill," or "pending-available." It will be understood that the state names are for illustration purposes only and any suitable number of states with any logical name may be used as appropriate.

The "available" state may be used when segment 215 is first created, and later, when it has been restored to a useable state. An available segment 215 has no active buffers in the segment of the buffer pool that it controls. Often, the entire area is unused. In certain embodiments, available segments 215 are stacked off the "available header," in LIFO order, included in management header 205.

The "allocation" state may be used with segment 215 is currently being used to allocate buffers is called the "allocation segment." Allocation segment 215 is anchored in the allocation header resident in management header 205. When segment 215 is transitioned to the allocation state, it is normally given a substantially unique sequence number. Storage for buffers 217 is allocated from the current allocation segment 215. In certain embodiment, allocation comprises updating a "next free byte" address and reserving a portion of buffer pool 111 for buffer 217.

The "empty" state may be used when the current allocation segment 215 cannot satisfy a buffer allocation request, it is transitioned to "empty" state. In certain embodiments, this comprises part of a two-step transition from "allocation" to "refill".

The "refill" state may be used when segment 215, which was "empty," is further updated until one or more consumer processes 112 have processed all currently allocated buffers 217 in segment 215. Once consumer processes 112 finish processing buffers 217, it will restore the state to "available" and place segment 215 back on the available list in management header 205. In certain embodiments, "refill" segment 215 may not be anchored to a management variable 207.

The "pending-available" state may used by decoupler 110 to manage race conditions between consumer process 112, trying to free storage in segment 215, and producer process 108, which transitioned the state of segment 215 from "allocation" to "empty".

Moreover, the logical separation of each segment header 210 from the associated segment 215 may improve storage reference patterns or allow segments 215 and management information to reside in remote locations.

Management header 205 comprises a plurality of management variables and objects 207 such as, for example, a "Queue Header," an "Available Segment" list header, an "Active Buffer" list header, an "Allocation Header," and a "Next Allocation Sequence Number." Queue header 207 comprises a queue pointing to all or substantially all of segment headers 210. Available segment list header 207 comprises a LIFO stack of segment headers 210 with an associated state of "available". Active buffer list header 207 comprises a LIFO stack of buffers 217, if any, currently queued to one of the consumer processes 112. Allocation header 207 comprises a pointer to the currently selected segment 215, if there is one, with associated segment header 210 comprising a state of "allocate." Next allocation sequence number 207 comprises the next available sequence number utilized in activating one of the segments 215. It will be understood that management header 205 may include none, some, or all example management variables 207 or other variables without departing from the scope of this disclosure.

Figure 3:
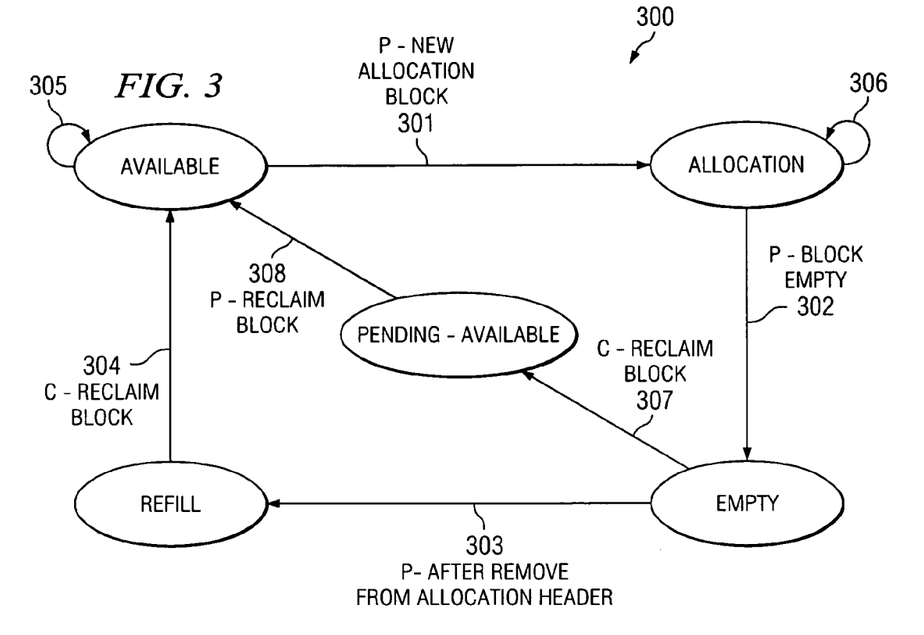
FIG. 3 is a diagram illustrating example state transitions for a segment header associated with the example system in FIG. 1.

FIG. 3 is a diagram 300 illustrating example state transitions for segments 215 or the associated segment headers 210. The illustrated diagram 300 includes eight transitions, labeled 301 through 308, respectively. In certain embodiments, the state of segment 215 is transitioned, updated, or changed using the associated segment header 210 and management header 205. For illustration purposes, example diagram 300 may be represented by the following chart:

|  | From | | | | |
|---|---|---|---|---|---|
| To | Available | Allocation | Empty | Pend-Avail | Refill |
| Available | 305 | — | — | 308 | 304 |
| Allocation | 301 | 306 | — | — | — |
| Empty | — | 302 | — | — | — |
| Pend-Avail | — | — | 307 | — | — |
| Refill | — | — | 303 | — | — |

Transition 301 changes the state of segment 215 from "available" to "allocation." In one embodiment, transition 301 occurs when segment 215 is made the active "allocation" segment. The segment address is swapped into the allocation header in management header 205. In one embodiment, this transition is performed or requested by producer process 108. Transition 302 changes the state of segment 215 from "allocation" to "empty". This is where segment 215, which has insufficient available space for a buffer allocation request, is removed from allocation state and prepared for reclamation. In one embodiment, this transition is performed or requested by producer process 108. Transition 303 changes the state of segment 215 from "empty" to "refill." This is where the particular segment 215 that was marked empty is transitioned to awaiting refill, following successful removal from the allocation header in management header 205. In one embodiment, this transition is performed or requested by producer process 108.

Transition 304 changes the state of segment 215 from "refill" to "available." This is where segment 215 has had all space reclaimed and is now ready for use. Segment 215 is then placed on the available queue in management header 205. In one embodiment, this transition is performed or requested by consumer process 112. Transition 305 changes the state of segment 215 from "available" to "available." This transition occurs when producer process 108 attempts to make segment 215 the active allocation segment 215, but finds that a second producer process 108 has done it. Segment 215 is placed back on the available queue in management header 205. In one embodiment, transition 305 is performed by producer process 108.

Transition 306 changes the state of segment 215 from "allocation" to "allocation." This transition may occur somewhat frequently because i) producer process 108 successfully allocates a buffer from segment 210 thereby leaving the state as "allocation"; or ii) consumer process 112 successfully frees all allocated storage in the current allocation segment 215, thereby restoring the next free address pointer and leaving the state as "allocation."

Transition 307 changes the state of segment 205 from "empty" to "pend-available." This state change occurs when the relevant consumer process 112 determines that segment 215, which it has managed to recover all used space in, is in the empty state. In other words, producer process 108 logically owns it, meaning that consumer process 112 should not reset the state to available. Rather, consumer process 112 sets the state to "pend-available" to communicate to producer process 108 that segment 215 is reusable. In one embodiment, transition 307 is performed or requested by consumer process 112. Transition 308 often occurs when producer process 108 determines that the attempt to change the segment state from Empty to Refill failed. This is may be due to consumer process 112 reclaiming space. Consumer process 112 resets the state to "pend-available" to inform the appropriate producer process 108. As a result, producer process 108 resets the buffer state to "available" and places it on the available queue. In short, transition 308 is often performed or requested by producer process 108.

State transition diagram 300 is for illustration purposes only and system 100 may include none, some, or all of example transitions 301-308 without departing from the scope of this disclosure. Moreover, system 100 may utilize other transitions or other states not illustrated in diagram 300.

Figure 4:
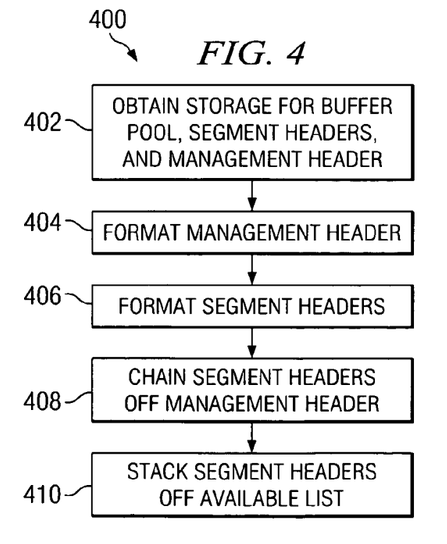
FIG. 4 is a flowchart illustrating an example method for initializing the decoupler in FIG. 2.

FIG. 4 is a flowchart illustrating an example method 400 for initializing decoupler 110. In general, the techniques included in method 400 create, initialize, or format a plurality of management variables 207 and buffer pool 111. Method 400 is described in respect to system 100 and example decoupler 110 of FIG. 2. However, any other suitable system or engine may use method 400 to initialize any embodiment of decoupler 110 for subsequent high-speed buffering of variable length data without departing from the scope of this disclosure. Moreover, the initialization of decoupler 110 may occur after buffering of variable length data in order to clear out memory or for any other suitable reason.

Initialization of decoupler 110 begins at step 402, where storage is obtained in memory 120 for buffer pool 111, segment headers 210, and management header 205. In one embodiment, the storage obtained for decoupler 110 exists in a single address space and may be obtained using any appropriate technique. Next, at step 404, management header 205 is formatted. This formatting may include initialization of one or more management variables 207 such as, for example, the queue header, the available segment list header, the active buffer list header, the allocation header, and the next allocation sequence number. Next, in steps 406 through 410, buffer pool 111 is segmented and made available for high-speed buffering of variable length data.

In step 406, buffer pool 111 is partitioned into a plurality of segments 215 and, then, the plurality of segments 215 are formatted or initialized. Once segments 215 are formatted, each segment 215 is chained off management header 205 using associated segment headers 210 one or more management variables 207. In one embodiment, segments 215 are chained off management header 205 using the queue header, which points to substantially all of the associated segment headers 210. At step 410, segments 215 are further stacked off the available segment list header included in management header 205, thereby allowing decoupler 110 to dynamically determine the next available segment 215.

Figure 5:
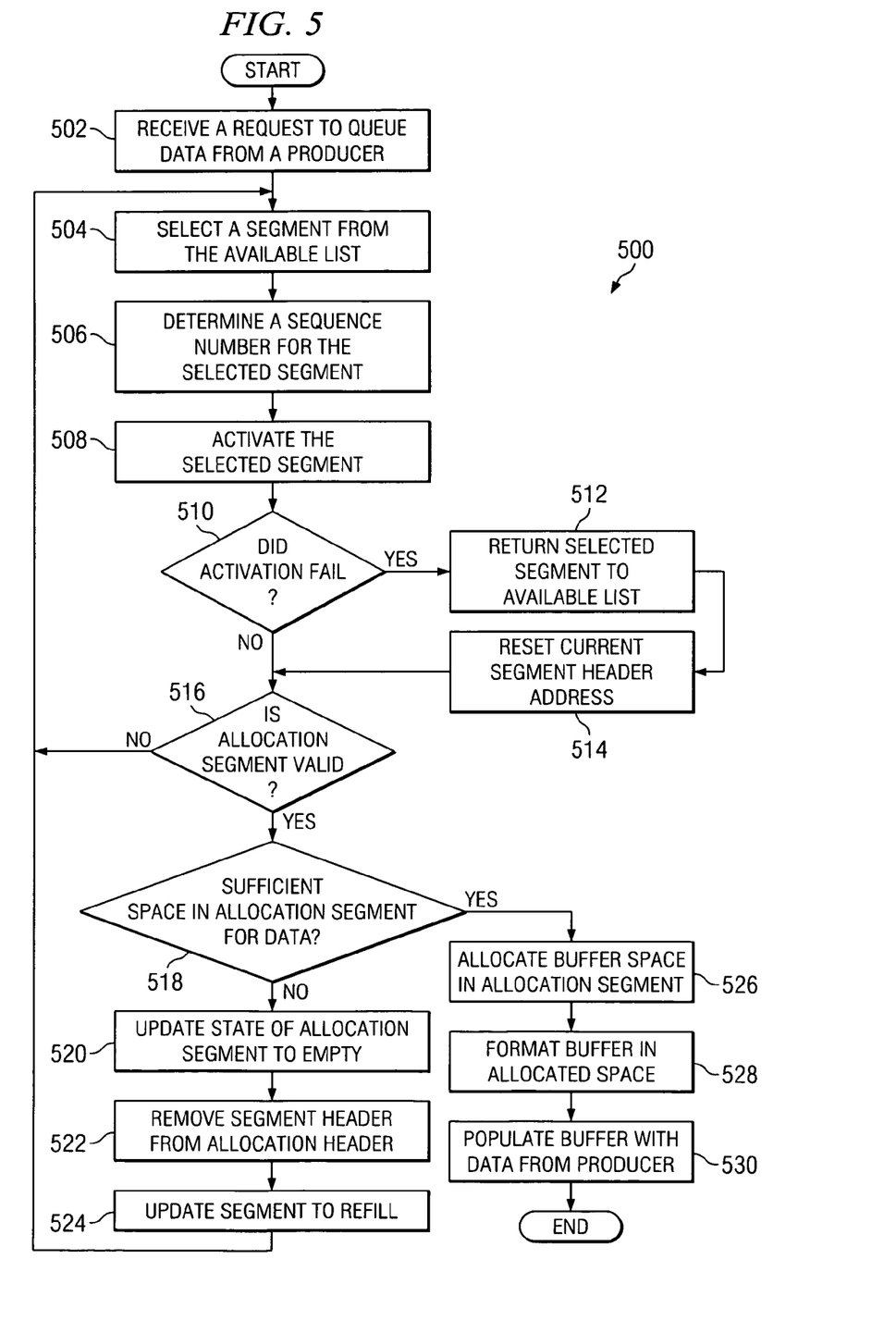
FIG. 5 is a flowchart illustrating an example method for buffering variable-length data in accordance with one embodiment of the present disclosure.

FIG. 5 is a flowchart illustrating an example method 500 for buffering variable length data from producer process 108 in accordance with one embodiment of the present disclosure. Generally, method 500 receives a request from producer process 108, selects at least one appropriate segment 215 based on the associated segment header 210 and the request, and creates a buffer in the selected segment 215. For readability purposes, the following description of method 500 involves receiving variable length data from a single producer processes 108. But it will be understood that any suitable number of producer processes 108 may be involved. As in FIG. 4, the following description will focus on the operation of decoupler 110 in performing method 500. But system 100 contemplates using any appropriate combination and arrangement of logical elements implementing some or all of the described functionality.

Decoupler 110 receives a request to queue data from a producer process 108 at step 502. Next, at step 504, decoupler 110 selects one segment 215 from the available list header, or stack, included in management header 205. As described above, decoupler 110 may select the first available segment 215 by locating the top address of the associated segment header 210 in the available list stack. For example, decoupler 110 may implement an algorithm such as the following:

```
Pick up an allocation header (Old.top, Old.sync)
Do Until (Swap succeeds)
    If (old.top = 0) then EXIT (No storage)
    Set New.top = Old.top->seghdr.nextavail
    Set New.Sync – Old.Sync
    Swap (header,Old,New)
End Do
Return (Old.Top)
```

It will be understood that the above algorithm is for illustration purposes only and does not limit the scope of this disclosure. Once the first available segment 215 has been suitably selected, it is activated in steps 506 through 514.

At step 506, decoupler 110 determines a sequence number for the selected segment 215. In certain embodiments, the sequence number is substantially unique to help ensure that stale segments 215 are not used. In other words, once a first segment 215 ceases to be the current allocation segment 215, decoupler 110 will not normally attempt to allocate a buffer 217 using the old segment. Once a sequence number has been determined, the selected segment 215 is activated at step 508. According to particular embodiments, first segment header 210 associated with the selected segment 215 is prepared for activation by transitioning the state to "allocation" and updating a segment header sequence number to at least a portion of the sequence number determined in step 506. Next, the allocation segment header located in management header 205 is updated to include the address of the associated segment header 210 and the sequence number generated in step 506. To enhance consistency and reliability, decoupler 110 may ensure that activation of the selected segment 215 did not fail in steps 510 through 514.

At decisional step 510, decoupler 110 first determines if the activation failed. Activation failure may occur for a variety of reasons including when another producing process 108 has selected another segment 215 as the current allocation segment 215. If activation did fail, then execution proceeds to step 512 where decoupler 110 returns the selected segment 215 to the available list in management header 205. Next, if there is another current allocation segment 215, then the address of that segment 215 is returned to producer process 108. If the activation did not fail at decisional step 510 or another segment 215 is the current allocation segment 215, then processing proceeds to steps 516 through 530 where buffer 217 is allocated.

At decisional step 516, decoupler 110 determines if the current allocation segment 215 is valid. In one embodiment, validation of the current allocation segment 215 comprises ensuring the allocation segment 215 exists, ensuring that the sequence numbers match, and insuring that the state of the current segment header 210 is set to "allocation". If the allocation segment 215 is invalid then processing returns to step 504 where another segment 215 is selected from the available list. If the validation is successful, then processing proceeds to decisional step 518. At decisional step 518, decoupler 110 determines if there is sufficient space in the current allocation segment for the current data from producer process 108. If there is insufficient space in the allocation segment 215, then decoupler 110 updates the state of allocation segment 215 to "empty" at step 520. Next the address of the associated segment header 210 is removed from the allocation header in management header 205 at step 522. Next the state of segment 215 is updated to "refill" at step 524 and execution returns to step 504 where another segment 215 is selected from the available list.

Returning to decisional step 518, if there was sufficient space in allocation segment 215 for the expected data, then the buffer space is allocated in the current segment 215 at step 526. Once the buffer space has been allocated, the decoupler formats buffer 217 in the allocated space at step 528. According to particular embodiments, formatting buffer 217 may include formatting the internal header located in buffer 217. As described above, this internal header may include the total length, the data length, and any other appropriate field. The internal header may also include the next active pointer used for the active queue. Next, at step 530, decoupler 110 populates the formatted buffer 217 with the data from producer process 108.

Figure 6:
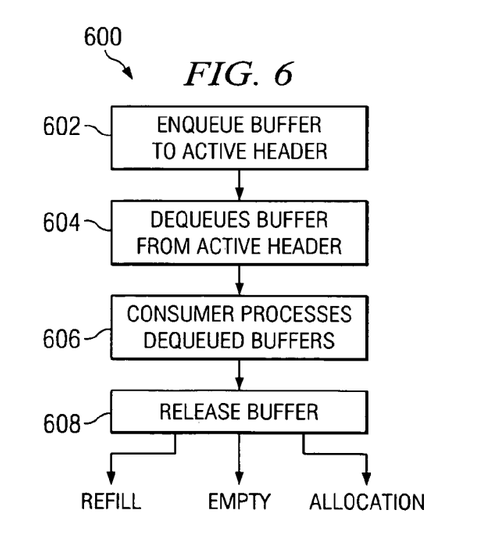
FIG. 6 is a flowchart illustrating an example method for communicating buffered data to a consumer process in accordance with one embodiment of the present disclosure.

FIG. 6 is a flowchart illustrating an example method 600 for communicating buffered data to consumer process 112. At a high level, method 600 involves restoring at least a portion of parameters 146 in a first object 145 based on primary and secondary parameters 146 in a second object 145. For readability purposes, the following description of method 600 involves communicating variable length data to a single consumer process 112. But it will be understood that any suitable number of consumer processes 112 may be involved. As in FIG. 4, the following description will focus on the operation of decoupler 110 in performing method 600. But system 100 contemplates using any appropriate combination and arrangement of logical elements, implementing some or all of the described functionality. It will be understood that decoupler 110 may pass the queued data to consumer process 112 any appropriate time.

At step 602, decoupler 110 enqueues the populated buffer 217 to the active header in order for consumer process 112 to locate and process the populated data. Buffer 217 may be enqueued to the active header using any appropriate technique or algorithm such as, for example:

```
Load active header (Ahdr.Top,Ahdr.ECB)
Do Until (Swap succeeds)
    Set Buff.Prev = Ahdr.Top
    Set Nhdr.Top = Buff
    Set Nhdr.ECB = Ahdr.Ecb
    If (Nhdr.ECB not Waiting) then
        Set Nhdr.ECB = X"40000000"
    Swap header (Ahdr,Nhdr)
End Do
If (Nhdr.ECB is Waiting)
    Post Header ECB
```

It will be understood that the above algorithm is for illustration purposes only and does not limit the scope of this disclosure. In certain embodiments, the active buffer header comprises a double word including a top buffer pointer and a consumer ECB. According to certain embodiments, decoupler 110 enqueues buffer 217 by first loading the old value of the active buffer header. Next, a new active buffer header is calculated using the top upper pointer as the address of the new buffer 217 being enqueued and setting the consumer ECB to either a posted ECB status or the old value. The next active field in buffer 217 is then set to the old top buffer pointer. Next, the headers are swapped. Once the ECB is in waiting status, then a POST is issued.

Once buffer 217 is enqueued to the active header, buffer 217 is dequeued from the active header to consumer process 112 at 604. According to one embodiment, consumer process 112 performs this operation using any appropriate technique such as, for example:

```
Loop:
    Swap active header, new = 0/0
    If (Failure), Goto Loop
    If (hdr.top = 0) Then
        Wait (hdr.ecb)
        Goto Loop
    Reverse removed buffer list onto temporary header
    While (temp hdr not 0)
        Pop top buffer and process it
        Free Buffer
    End While
    Goto Loop
```

As above, this algorithm is for illustration purposes only and is not meant to limit the scope of this disclosure. Once buffer 217 is dequeued, consumer process 112 processes the contents of buffer 217. For example, consumer process 112 may pass the queued data to another application's exit. In this example, consumer process 112 may pass the address and length of the data portion of buffer 217 to the application exit.

Once buffer 217 is suitably processed by consumer process 112, buffer 217 is released at step 608. In particular embodiments, releasing buffer 217 comprises updating the total free bytes value in the associated segment header 210. In other words, the release of buffer 217 may not include any manipulation of the actual buffer 217. Again, any appropriate technique or algorithm may be used to release buffer 217 such as, for example:

```
Set Seg.totfreed = seg.totfreed + buflen
Load Segment alloc header (Ahdr)
Loop:
    Set avail = seg.totfreed + seg..Remaining
    If (Avail < Seg.Buflen) Then EXIT
    If (Avail > Seg.Buflen) Then ABEND
    * - segment "appears" to be empty now
    If (Ahdr.State = "Refill") Then
        Set Nhdr = (Seg.Bufstart,"Avail,"0)
        Swap (Ahdr,Nhdr)
        If (Failure) Then ABEND
        Push segment onto available list
        Exit
    If (Ahdr.State = "Alloc") Then
        Set Nhdr = (Seg.Bufstart,"Alloc,"Ahdr.seq#)
        Swap (Ahdr,Nhdr)
        If (Failure) Then Goto Loop
        Exit
    If (Ahdr.State = "Empty") Then
        Set Nhdr = (Seg.Bufstart,"Pend-Avail,"Ahdr.seq#)
        Swap (Ahdr,Nhdr)
        If (Failure) Then Goto Loop
        Exit
    ABEND (Bad state)
```

The above example algorithm illustrates that when segment 215 appears to be empty, the associated segment header 210 may be in one of three states: "refill," "empty," and "allocation." If segment 215 is associated with state "refill," then consumer process 112 owns segment 215 and will be able to place it in the "available" queue. If segment 215 is associated with state "empty," then producer process 108 owns it. Then, consumer process 112 handshakes with that producer process 108 and allows producer process 108 finish the job of placing the segment back on the "available" queue. If segment 215 is associated with state "allocation," then segment 215 is the active, or current, allocation segment 215. Consumer process 112 may reset the allocation fields in the associated segment header 215, thereby and allowing segment 215 to remain active. Regardless of which state is found and processed, once segment 215 is appropriately processed, consumer process 112 may then, at any appropriate time, reset the "total freed bytes" field to zero.

The preceding flowcharts and accompanying descriptions illustrate exemplary methods of operation for buffering of variable length data. However, these methods are merely illustrative, and system 100 contemplates decoupler 110 implementing any suitable techniques for suitably high-speed buffering of variable length data between producer process 108 and consumer process 112 using some or all of the disclosed methods. Accordingly, any or all of these techniques may be used separately and/or together as appropriate to increase the speed and reliability of buffering variable length data. Moreover, because the flowcharts and descriptions are only illustrative, system 100 contemplates decoupler 110 using methods with additional steps, fewer steps, and/or different steps, in any order, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for buffering variable length data at a decoupler comprises:
    receiving, at a decoupler, a request to queue variable length application data from a producer for subsequent processing by a particular consumer associated with the producer, the decoupler comprising a management header and a buffer pool for temporary storage of application data, and the received request comprising the length of the variable length application data;
    in response to the received request, dynamically selecting one of a plurality of segments in the buffer pool based, at least in part, on an available segment list header included in the management header, each of the plurality of segments having a same fixed length;
    in response to the received request, determining whether sufficient space exists in the selected segment for the variable length application data based on the received request;
    in response to the received request and a determination that sufficient space does exist in the selected segment for the variable length application data,
        i) automatically allocating buffer space in the selected segment based on the received request;
        ii) dynamically creating and formatting one or more variable length buffers in the allocated buffer space of the selected segment, the one or more variable length buffers having an aggregate length less than or equal to the fixed length of the selected segment;
        iii) receiving the variable length application data from the producer; and
        iv) populating the formatted one or more variable length buffers with the received variable length application data; and
    notifying the particular consumer associated with the producer that the buffered application data is available for processing.

2. The method of claim 1, the decoupler further comprising a plurality of segment headers, each segment in the buffer pool associated with one segment header, the segment header comprising an address.

3. The method of claim 2, each segment header comprising a state, the state comprising an available state, an allocation state, or an empty state.

4. The method of claim 3, the management header further comprising a queue header, and an allocation header; and each segment header associated with the queue header.

5. The method of claim 4 further comprising activating the selected segment prior to allocating space in the selected segment.

6. The method of claim 5, wherein activating the selected segment comprises:
    determining a sequence number for the selected segment;
    transitioning the state of the associated segment header from the available state to the allocation state;
    updating the segment header with at least a portion of the determined sequence number; and
    updating the allocation segment header to include the address of the associated segment header and the determined sequence number.

7. The method of claim 4, in response, at least in part, to the failure of allocation of space in the selected segment, further comprising:
    transitioning the state of the segment header associated with the selected segment to the empty state;
    disassociating the segment header from the allocation header; and
    selecting a second segment from the plurality of segments in the buffer pool.

8. The method of claim 2 further comprising initializing the plurality of segments by stacking each associated segment header on the available segment list header.

9. The method of claim 4, the buffer space comprising an address and the queued data, the management header further comprising an active buffer header, and the method further comprising:
    updating the active buffer header with the address of the buffer space; and
    in response at least in part to a consumer processing the queued data, releasing the buffer space.

10. The method of claim 1 further comprising:
    receiving, at the decoupler, a second request to queue variable length data from a second producer;
    automatically allocating a second buffer space in the selected segment based on the second request; and
    populating the allocated second buffer space with the variable length data.

11. A decoupler for buffering variable length data comprising a management header and a buffer pool, the decoupler operable to:
    receive a request to queue variable length application data from a producer for subsequent processing by a particular consumer associated with the producer, the decoupler comprising a management header and a buffer pool for temporary storage of application data, and the received request comprising the length of the variable length application data;

in response to the received request, dynamically select one of a plurality of segments in the buffer pool based, at least in part, on an available segment list header included in the management header, each of the plurality of segments having a same fixed length;

in response to the received request, determine whether sufficient space exists in the selected segment for the variable length application data based on the received request;

in response to the received request and a determination that sufficient space does exist in the selected segment for the variable length application data,
  i) automatically allocate buffer space in the selected segment based on the received request;
  ii) dynamically create and format one or more variable length buffers in the allocated buffer space of the selected segment, the one or more variable length buffers having an aggregate length less than or equal to the fixed length of the selected segment;
  iii) receive the variable length application data from the producer; and
  iv) populate the formatted one or more variable length buffers with the received variable length application data; and notify the particular consumer associated with the producer that the buffered application data is available for processing.

12. The decoupler of claim 11, further comprising a plurality of segment headers, each segment in the buffer pool associated with one segment header, the segment header comprising an address.

13. The decoupler of claim 12, each segment header comprising a state, the state comprising an available state, an allocation state, or an empty state.

14. The decoupler of claim 13, the management header further comprising a queue header, and an allocation header; and each segment header associated with the queue header.

15. The decoupler of claim 14 further operable to activate the selected segment prior to allocating space in the selected segment.

16. The decoupler of claim 15, wherein the decoupler operable to activate the selected segment comprises the decoupler operable to:
  determine a sequence number for the selected segment;
  transitioning the state of the associated segment header from the available state to the allocation state;
  update the segment header with at least a portion of the determined sequence number; and
  update the allocation segment header to include the address of the associated segment header and the determined sequence number.

17. The decoupler of claim 14, in response, at least in part, to the failure of allocation of space in the selected segment, further operable to:
  transition the state of the segment header associated with the selected segment to the empty state;
  disassociate the segment header from the allocation header; and
  select a second segment from the plurality of segments in the buffer pool.

18. The decoupler of claim 12 further operable to initialize the plurality of segments by stacking each associated segment header on the available segment list header.

19. The decoupler of claim 14, the buffer space comprising an address and the queued data, the management header further comprising an active buffer header, and the decoupler further operable to:
  update the active buffer header with the address of the buffer space; and
  in response at least in part to the consumer processing the queued data, release the buffer space.

20. The decoupler of claim 11 further operable to:
  receive a second request to queue variable length data from a second producer;
  automatically allocate a second buffer space in the selected segment based on the second request; and
  populate the allocated second buffer space with the variable length data.

21. A system for buffering variable length data comprising:
  memory that stores a management header and a buffer pool for temporary storage of application data; and
  one or more processors collectively operable to:
    receive a request to queue variable length application data from a producer for subsequent processing by a particular consumer associated with the producer, the received request comprising the length of the variable length application data;
    in response to the received request, dynamically select one of a plurality of segments in the buffer pool based, at least in part, on an available segment list header included in the management header, each of the plurality of segments having a same fixed length;
    in response to the received request, determine whether sufficient space exists in the selected segment for the variable length application data based on the received request;
    in response to the received request and a determination that sufficient space does exist in the selected segment for the variable length application data,
      i) automatically allocate buffer space in the selected segment based on the received request;
      ii) dynamically create and format one or more variable length buffers in the allocated buffer space of the selected segment, the one or more variable length buffers having an aggregate length less than or equal to the fixed length of the selected segment;
      iii) receive the variable length application data from the producer; and
      iv) populate the formatted one or more variable length buffers with the received variable length application data; and
    notify the particular consumer associated with the producer that the buffered application data is available for processing.

22. The system of claim 21, the memory further storing a plurality of segment headers, each segment in the buffer pool associated with one segment header, the segment header comprising an address.

23. The system of claim 22, each segment header comprising a state, the state comprising an available state, an allocation state, or an empty state.

24. The system of claim 23, the management header further comprising a queue header, and an allocation header; and each segment header associated with the queue header.

25. The system of claim 24, the processors further operable to activate the selected segment prior to allocating space in the selected segment.

26. The system of claim 25, wherein the processors operable to activate the selected segment comprise processors operable to:

determine a sequence number for the selected segment;

transition the state of the associated segment header from the available state to the allocation state;

update the segment header with at least a portion of the determined sequence number; and update the allocation segment header to include the address of the associated segment header and the determined sequence number.

27. The system of claim 24, in response, at least in part, to the failure of allocation of space in the selected segment, the processors further operable to:

transition the state of the segment header associated with the selected segment to the empty state;

disassociate the segment header from the allocation header; and select a second segment from the plurality of segments in the buffer pool.

28. The system of claim 22, the processors further operable to initialize the plurality of segments by stacking each associated segment header on the available segment list header.

29. The system of claim 24, the buffer space comprising an address and the queued data, the management header further comprising an active buffer header, and the processors further operable to:

update the active buffer header with the address of the buffer space; and in response at least in part to the consumer processing the queued data, release the buffer space.

30. The system of claim 21, the processors further operable to:

receive a second request to queue variable length data from a second producer;

automatically allocate a second buffer space in the selected segment based on the second request; and populate the allocated second buffer space with the variable length data.

* * * * *